Dec. 19, 1950  R. G. OSSBAHR ET AL  2,534,986
COLLAPSIBLE BABY CARRIAGE
Filed May 9, 1949  2 Sheets-Sheet 1

Inventors:
Richard Gunnar Ossbahr
Otto Linus Andersson
by W. Bayard Jones
Attorney Inventors:
Richard Gunnar Ossbahr
Otto Linus Andersson
by W. Bayard Jones
Attorney Patented Dec. 19, 1950

2,534,986

UNITED STATES PATENT OFFICE 2,534,986

COLLAPSIBLE BABY CARRIAGE

Richard Gunnar Ossbahr, Sundbyberg, and Otto Linus Andersson, Lahall, Sweden, assignors, by mesne assignments, to Erik Georg Gärdin, Stockholm, Sweden Application May 9, 1949, Serial No. 92,162
In Sweden May 12, 1948

1 Claim. (Cl. 280—42)

The present invention relates to a collapsible baby carriage of the kind in which the wheels of the carriage are journalled in two side members which are adjustably connected to one another by means of toggle links or the like, in such manner that said side members may be moved apart when the carriage is to be used, and may also be moved towards one another for collapsing the carriage, there being provided between said side members a piece of fabric or similar flexible material which is stretched to serve as a seat when the side members are moved apart preparatory to using the carriage.

It is the purpose of this invention to provide a baby carriage of this type in which a child can sit safely and be well protected against being hurt. With this purpose in view the invention is characterized by each of the two side members consisting of a box-like upright frame which is open at its lower side, and in which the wheels are journalled on stationary shafts in such manner that a minor portion only of the wheels projects below the lower edges of the box-like frame, said two frames extending above the seat in its stretched position when the carriage is used. By this arrangement the upper portions of the said box-like frames serve as side supports or arm rests for a child sitting in the carriage, and in addition, the frames effectively prevent the child from putting its fingers into the wheels and being damaged. Simultaneously, the box-like frames also serve as mudguards over the wheels. Between the lower portions of the two frames there may suitably be provided a foot-rest consisting of two members hinged to one another and to the frames, and arranged in such manner that when the carriage is collapsed, they swing upwards and are thus folded against one another, while in the position for use and particularly when the child rests its feet upon the foot-rest, the latter will aid in securely holding the frames in their separated positions.

Figure 1:
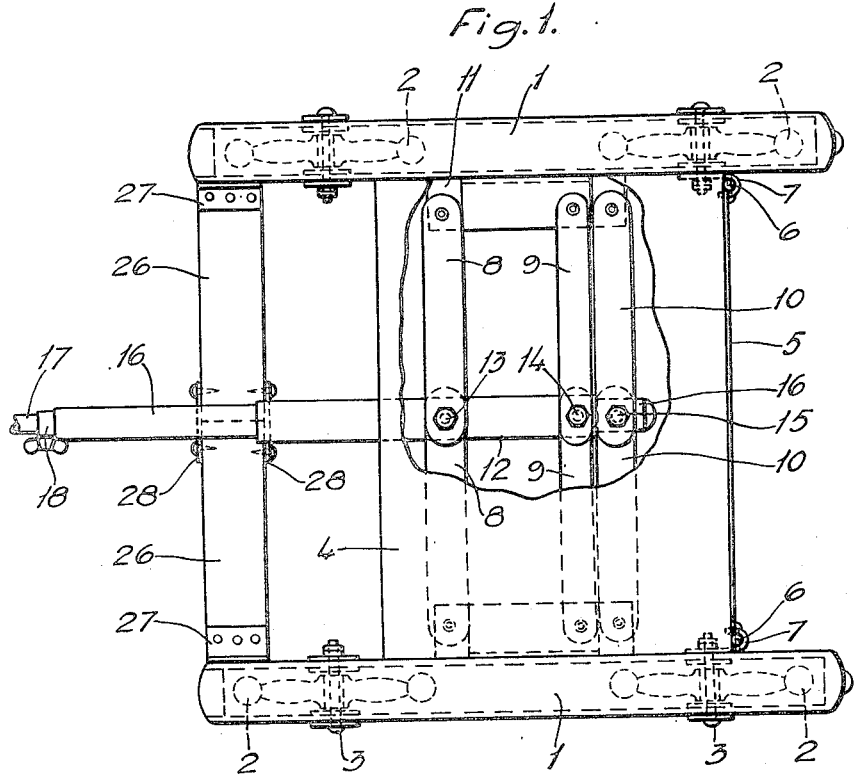
Figure 2:
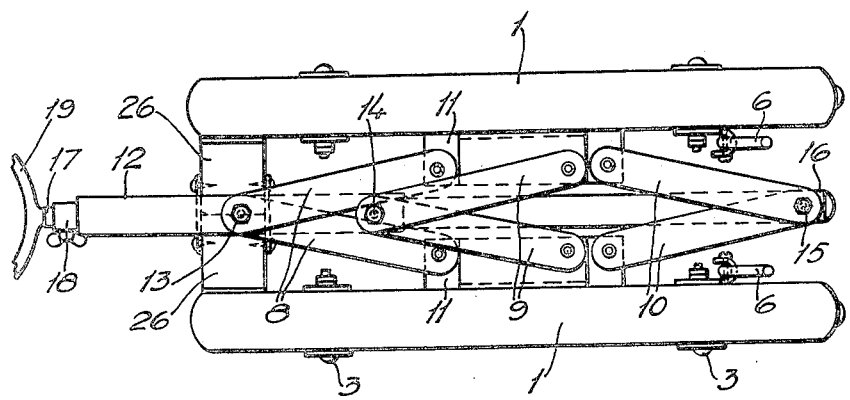
Figure 3:
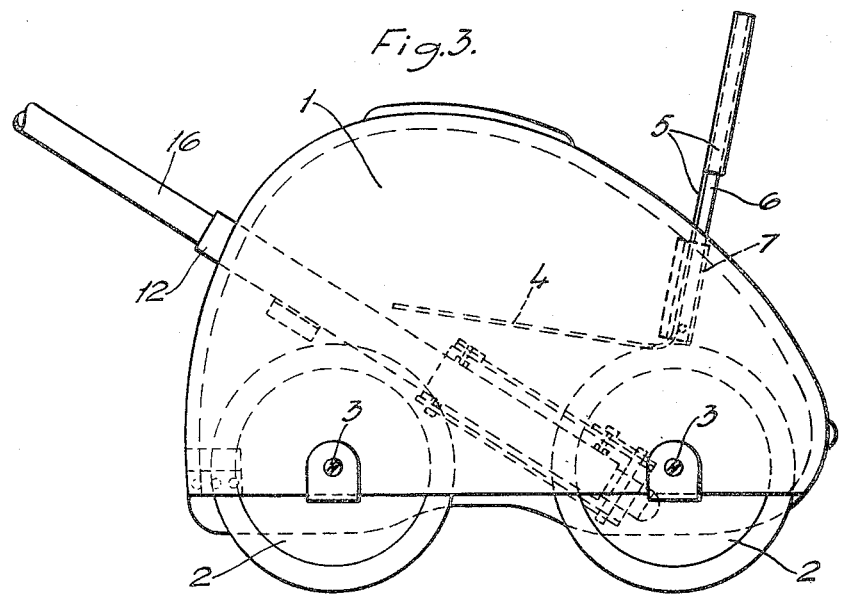
Figure 4:
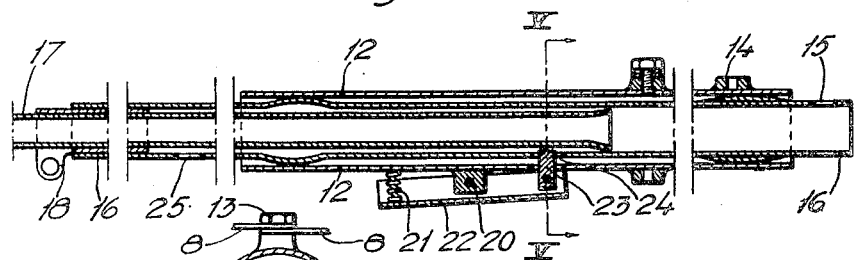
Figure 5:
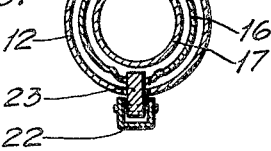
Figure 6:
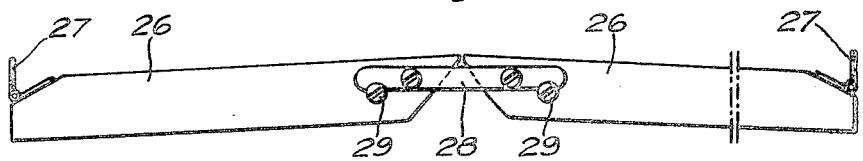

The accompanying drawings illustrate by way of example a constructional form of a baby carriage according to the invention. Fig. 1 shows the baby carriage in top plan view and in expanded position for use, and Fig. 2 shows the carriage in collapsed condition. Fig. 3 shows a side view of the carriage. Fig. 4 shows on a larger scale a broken longitudinal section of parts of the mechanism for expanding and collapsing the carriage, and Fig. 5 shows a cross section on the line V—V in Fig. 4. Fig. 6 shows the foot-rest in its lowered position for use, viewed from the side.

The structure or frame of the baby carriage as illustrated in the drawing comprises two side members which are adjustably connected to one another, and which are made in the shape of two narrow upright boxes 1 which are closed at the top but open at the bottom, and in the lower portions of which the wheels 2, of which there are two in each side member, are journalled on stationary short axles 3 secured in the side walls of the boxes in such manner that a minor portion only of the wheels extends below the lower edges of the boxes. The upper portions of the boxes 1, which are shaped in the manner illustrated in Fig. 3, project a considerable distance above the seat 4 which consists of a piece of fabric or the like secured between the box-like members 1, so that the upper portions of said members 1 serve as side supports and arm-rests for a child sitting in the carriage. The same piece of fabric also forms a back 5, this portion of the piece of fabric being attached to two rods 6 which are pivotally attached to supports 7 secured to the inner sides of the boxes in such manner that said rods may be turned down over the seat 4, i. e. to the left as viewed in Fig. 3, when the carriage is not used.

The adjustable connection between the two box-like side members 1 is effected, in a manner known per se, by means of three pairs of toggle links 8, 9 and 10. The outer ends of these links are pivotally attached to brackets 11 secured to the inner sides of the two box-like members 1. The inner ends of the links 8 are pivotally attached at 13 to one another and to an outer tube 12, and the inner ends of the links 9 are pivotally attached at 14 to one another and to the said outer tube 12, Figs. 1, 2, 4 and 5, while the inner ends of the links 10 are pivotally connected, at 15 in Figs. 1, 2 and 4, to one another and to an inner tube 16 which is slidable in the outer tube 12. In this way it is possible to move the toggle links of the various pairs towards and away from one another by sliding the tube 16 forwards and backwards in the outer tube 12. This motion of the tube 16 is effected, in the instance illustrated, by means of a third tube 17 which is slidable in the tube 16 to which it may be locked by means of a screw clamp band 18, said tube 17 being provided at its outer end with a handle 19 which also serves for pushing or drawing the carriage when in its expanded position for use, and for carrying the carriage in its collapsed condition. For locking the tubes 12 and 16 to one another in the two positions which correspond, respectively, to the position for use and to the collapsed position of the carriage, there is provided on the lower side of the outer tube 12 a catch device which consists of a lever 22 which is rotatable on a pivot 20 and is actuated by a spring 21, and which carries a pawl 23 which extends through a hole in the tube 12 and is adapted to engage either of two holes 24 and 25 in the inner tube 16, see Fig. 4.

Inserted between the lower portions of the two box-like members 1 is a foot-rest which consists of two members 26 hingedly attached by means of hinges 27 to the inner sides of the box-like members, and which are hingedly connected to one another by means of short connecting links 28. The said members 26 are adapted to swing upwards against one another when the carriage is collapsed, and when the carriage is expanded, they occupy the relative positions illustrated in Fig. 6 in which the connecting links 28 bear against stop screws 29 screwed into the members 26. In this position the foot-rest aids in holding the box-like members 1 in their expanded position, particularly when a child sitting in the carriage rests its feet on the foot-rest.

When the carriage is collapsed and the toggle links 8, 9 and 10 occupy the positions illustrated in Fig. 2, the inner tube 16 is displaced so far to the right in Figs. 2 and 4, beyond the end of the outer tube 12, that the pawl 23 is in engagement with the hole 25 in the inner tube 16, and in this way the carriage is locked in its collapsed position. In this position the two members 26 of the foot-rest are swung upwards so that they form an acute angle to one another. When the carriage is to be used, pressure is applied to the lever 22 so as to move said lever against the action of the spring 21 so far that the pawl 23 is moved out of engagement with the hole 25. By means of the handle 19, the tube 17 of which is secured to the tube 16 by means of the clamp band 18, the tube 16 is pulled out from the outer tube 12 in a direction to the left in Figs. 2 and 4, until the hole 24 in the tube 16 comes opposite the pawl 23. In this way the toggle links 8, 9 and 10 are caused to occupy the positions shown in Fig. 1. When the lever 22 is released, the spring 21 turns said lever and forces the pawl 23 into engagement with the hole 24, thus locking the carriage in the expanded position shown in Fig. 1. During the movement described the foot-rest members 26 are lowered to the position shown in Fig. 6, so that a child sitting in the carriage with one leg on each side of the tube 16 can comfortably rest its feet on the foot-rest. The clamp band 18 is now loosened, so that the handle tube 17 is freed from the tube 16, after which said tube 17 is pulled out to the desired length and is then again locked to the tube 16 by means of the clamp band 18. The back consisting of the two rods 6 and the piece of fabric 5 attached thereto, is now swung up to the position illustrated in Figs. 1 and 3, after which the carriage is ready for use.

When the carriage is to be collapsed, the same operations are performed but in the opposite order. The rods 6 are folded down over the seat 4, the handle tube 17 is released from the tube 16 and is pushed into the latter and again secured thereto by means of the clamp band 18. Pressure is applied to the lever 22 to move the pawl 23 out of engagement with the hole 24 in the tube 16, and said tube 16 is pushed to the right, as viewed in Figs. 3 and 4, into the outer tube 12, until the pawl 23 comes opposite the hole 25 and engages said hole when the lever 22 is released. In this way the carriage is locked in collapsed condition, so that it may conveniently be carried in the handle 19.

The constructional form above described and illustrated in the drawings is only to be regarded as an example, and it will be understood that the details thereof may be modified in various ways within the scope of the accompanying claims.

We claim:

A collapsible baby carriage comprising in combination two side members and at least one wheel for each side member, an outer tube centrally disposed between said side members, an inner tube telescopically carried within said outer tube, at least two pairs of pivotally connected toggle links, the outer ends of each pair being pivotally connected one to each side member, the inner ends of one pair being attached to said outer tube and the inner ends of the other pair being attached to a portion of said inner tube which extends beyond said outer tube whereby said pairs of toggle links are movable in opposition to each other to collapse and expand the carriage as the tubes are telescoped, and a seat made of a flexible material and secured to the inner sides of said side members, each of said side members consisting of a narrow upright box-like frame open at its lower side, and including two parallel side walls and a separate axle for each wheel fixedly mounted at its ends to the said side walls, said wheels being journalled one on each axle, and said axles providing a fixed mounting for said wheels and being located in said box-like frames in such manner that a minor portion only of the wheels projects below the lower edges of said box-like frames so that said wheels are available for rolling action when said carriage is in both collapsed and expanded condition, said box-like frames projecting above said seat when said carriage is in expanded condition, whereby the upper portions of said box-like frames serve as side supports and arm rests for a child sitting in the carriage.

RICHARD GUNNAR OSSBAHR.
OTTO LINUS ANDERSSON.

REFERENCES CITED

The following references are of record in the file of this patent:

UNITED STATES PATENTS

| Number | Name | Date |
|---|---|---|
| 1,125,441 | Bailey | Jan. 19, 1915 |
| 2,484,939 | Fassett | Oct. 18, 1949 |